United States Patent [19]
Dixon

[11] Patent Number: 4,615,655
[45] Date of Patent: Oct. 7, 1986

[54] PULL TYPE FASTENER AND FASTENING SYSTEM FOR CONSTRUCTING ARTICLES SUCH AS SHIPPING CONTAINERS AND THE LIKE

[75] Inventor: Richard D. Dixon, San Juan Capistrano, Calif.

[73] Assignee: Huck Manufacturing Company, Irvine, Calif.

[21] Appl. No.: 743,954

[22] Filed: Jun. 12, 1985

[51] Int. Cl.$^4$ .................... F16B 21/00; B21D 39/00
[52] U.S. Cl. ................................. 411/339; 411/43; 411/353; 411/533; 29/512; 29/520; 29/523; 403/408.1
[58] Field of Search ............... 411/39, 43, 70, 338, 411/339, 352, 353, 360, 361, 362, 365, 501; 29/512, 520, 523; 403/408.1

[56] References Cited

U.S. PATENT DOCUMENTS

| | | | |
|---|---|---|---|
| 3,055,100 | 9/1962 | Kimpel | 411/360 |
| 3,491,649 | 1/1970 | Smouton et al. | 411/43 |
| 3,515,419 | 6/1970 | Baugh | 411/43 |
| 4,112,993 | 9/1978 | Dey | 411/501 |
| 4,168,650 | 9/1979 | Dahl et al. | 411/43 |

FOREIGN PATENT DOCUMENTS 2102057  1/1983  United Kingdom ............... 411/353

Primary Examiner—Gary L. Smith
Assistant Examiner—Neill Wilson
Attorney, Agent, or Firm—Harness, Dickey & Pierce

[57] ABSTRACT

A fastener for securing workpieces having aligned bores and including a tubular sleeve and a pin with the sleeve having an elongated sleeve shank and a through bore and the pin having an enlarged pin head and an elongated pin shank, the pin shank having a retaining groove and a lock groove located proximate thereto, a resilient retaining clip located in the retaining groove and being axially captured therein, the retaining clip being of a split construction and having a relaxed outside diameter greater than that of the workpiece bores and being adapted to be located in at least one of the bores with an interference fit to thereby axially retain the pin to the workpieces in a preassembly, the sleeve shank having a sleeve lock groove adapted to be radially deformed into an aligned lock groove in the pin, the sleeve shank having a grip adjusting groove adapted to deform radially whereby the fastener can accommodate workpieces varying in total thickness.

16 Claims, 9 Drawing Figures

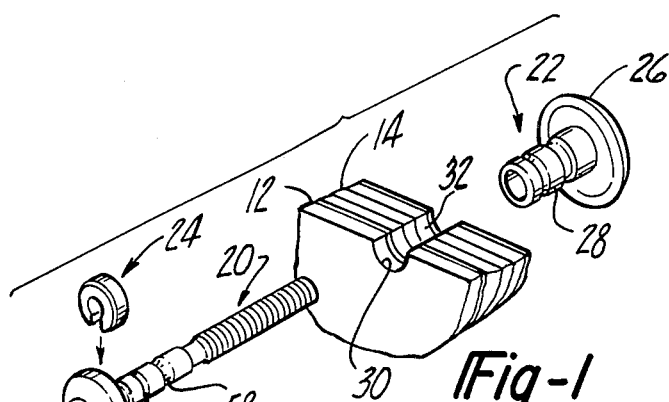
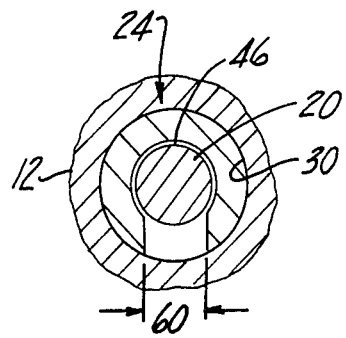
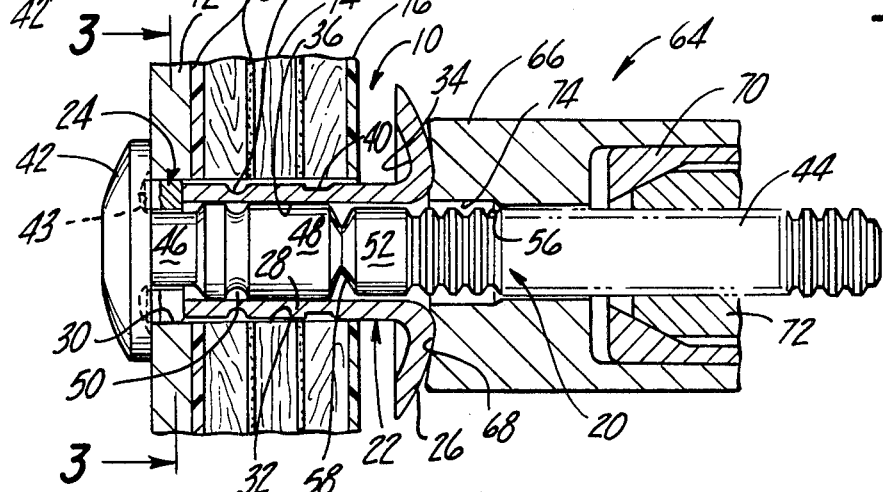
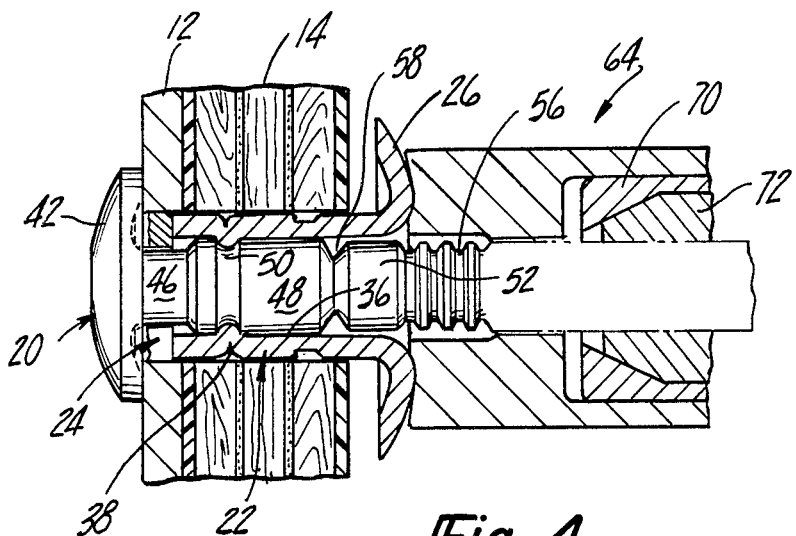

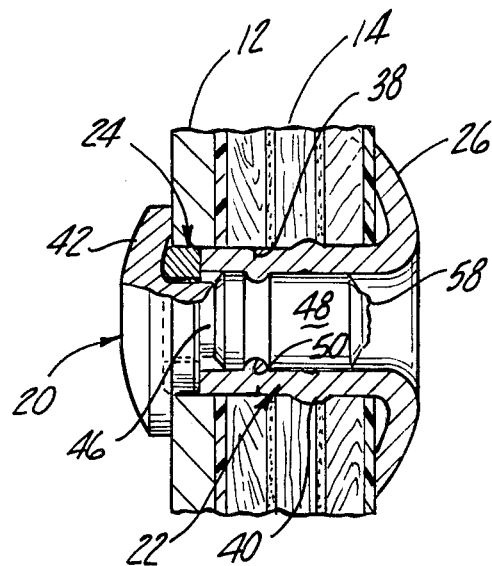
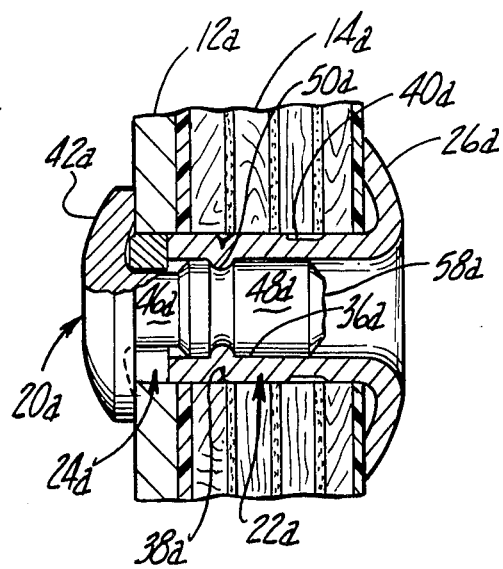
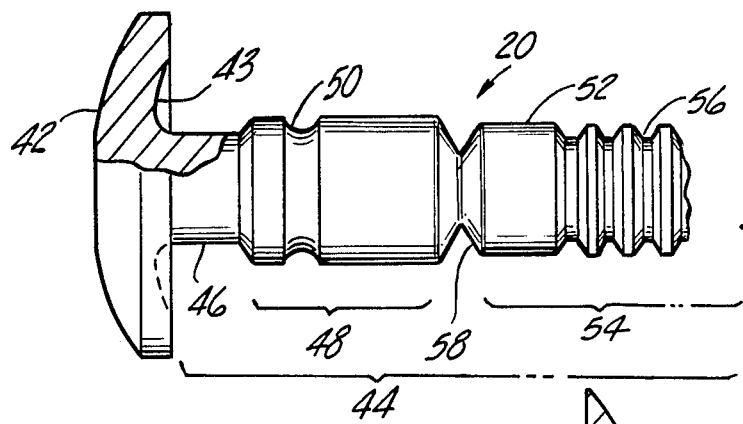
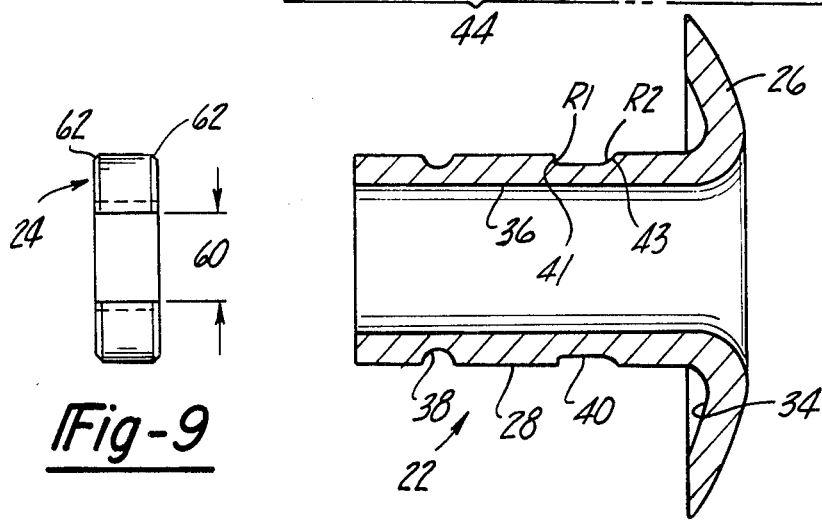

PULL TYPE FASTENER AND FASTENING SYSTEM FOR CONSTRUCTING ARTICLES SUCH AS SHIPPING CONTAINERS AND THE LIKE

SUMMARY—BACKGROUND OF THE INVENTION

The present invention relates to a pull type fastener for a fastening system for manufacturing articles such as shipping containers and the like.

Articles such as shipping containers are frequently of a construction including a hard metal exterior layer and one or more interior layers of softer materials such as plywood, fiberboard, etc. In fastening the layers together, pull type fasteners can be used of a type generally shown in the U.S. Pat. No. 3,515,419 issued to C. W. Baugh on June 2, 1970.

The latter form of pull type fastener includes a pin and a sleeve and is set by applying a relative axial force between the pin and sleeve via a pull portion on the pin; the excess or pull portion of the shank of the pin is severed upon completion of the installation. With this type of fastener, it is desirable that the fastener component engaging the interior surface of the workpiece have a relatively large head to provide good load distribution to inhibit crushing. It is also desirable that the fastener, after being set, have a relatively low profile and a smooth surface on the interior side; in a container application this contributes to maximizing the interior load carrying volume and in avoiding snagging of the contents on fastener protrusions. It is also desirable that the set fastener inhibit tampering, i.e. unauthorized fastener removal. In some cases, it may also be desirable that the fastener have a large bearing, low profile head to engage the outer container surface.

One of the problems with fastening systems providing the above features is that the installation procedure can be time consuming and/or costly. For example with a fastener of the type shown in the Baugh patent, supra, numerous installation steps are necessary.

For example, in the fabrication of shipping containers, the body of the container is plywood, or the like with structural connections between walls being made by metal brackets, straps, etc. Frequently these metal brackets, straps, etc. have preformed mounting holes. It is a common practice for the fastener to be installed by a single operator. Here the fastener opening through the container wall or body is first drilled by the operator from the outside or metal surface side. The operator then moves into the container or opposite side to insert a large headed sleeve (such as shown in Baugh). Now the operator returns to the exterior side of the container and inserts the shank of the cooperating pin into the sleeve with the pin head on the exterior side. Finally the same operator returns to the interior side, applies an installation tool to the protruding pin shank, and actuates the tool to set the fastener. It should be noted that in the above sequence there is a possibility that the sleeve or pin can fall out before the operator has had an opportunity to complete the next step. Of course, the number of steps required of a single operator would be somewhat simplified if two operators were used, i.e. one on the inside and one on the outside of the container. In either case the procedure is costly.

With the present invention, a fastener construction is shown which facilitates installation by a single operator with a minimum of steps, i.e. the operator need move from outside to inside (or the reverse) only once to install the fastener. At the same time, the fastener of the present invention provides a unique mechanical lock to secure the pin and sleeve together. In some constructions, such as in the Baugh patent supra, a friction lock is used to hold the pin and sleeve together. Thus, with that fastener, the magnitude of the installation load and hence ultimate clamp up of the workpieces was reduced to avoid excessive pin bounce and possible separation of pin and sleeve at pin break. With the mechanical lock of the present invention, the installation loads and hence final clamp up can be increased since pin bounce and separation of pin and sleeve upon pin break are inhibited.

In one form of the invention a multiple piece fastener construction is utilized which fastener construction provides, among other features, the noted ease of installation and desirable mechanical lock.

The invention also provides means for readily accommodating workpieces varying in total thickness over a relatively wide range of thicknesses. The fastener of the present invention also provides a unique construction for retaining the pin in the workpiece openings prior to installation under a sufficiently high load to inhibit the pin from falling out or being pushed out during subsequent installation steps.

Thus it is an object of the present invention to provide a new and improved fastening system including a unique pull type fastener for securing structural assemblies of the type noted in which the fastener can be installed by a single operator with a simplified procedure.

It is another object to provide a fastener, of the above noted type, having a unique mechanical lock between pin and sleeve.

It is another object to provide a unique fastener construction in which the pin can be securely preassembled to the workpieces and held in place for the subsequent installation steps.

It is a general object of the present invention to provide new and improved fastening system including unique fastener constructions for manufacturing shipping containers or the like.

Other objects, features, and advantages of the present invention will become apparent from the subsequent description and the appended claims, taken in conjunction with the accompanying drawings, in which:

FIG. 1 is an exploded pictorial view of the components of the fastener of the present invention relative to a structural assembly to be secured together;

FIG. 2 is an elevational view with some parts shown in section of the fastener of FIG. 1, in a structural assembly to be fastened together of workpieces of a minimum total thickness for the fastener but prior to being installed;

FIG. 3 is a sectional view of the fastener and structural assembly of FIG. 2 taken generally along the lines 3—3 in FIG. 2;

FIG. 4 is a view similar to that of the fastener of FIG. 2 depicting a first stage of installation of the fastener;

FIG. 5 is a view similar to that of FIGS. 2 and 4 of the fastener after it has been installed;

FIG. 6 is a view similar to that of FIG. 5 depicting the fastener installed in a structural assembly with workpieces having a maximum total thickness for the fastener;

FIG. 7 is an enlarged, fragmentary elevational view with some portions broken away of the pin of the fastener of FIGS. 1-5;

FIG. 8 is an enlarged fragmentary sectional view of the sleeve in FIGS. 1-5; and FIG. 9 is an enlarged side elevational view of the clip of the fastener of FIGS. 1-5.

Looking now to FIG. 2, a fastener 10 is shown in assembly relationship with a plurality of workpieces 12 and 14. For a typical shipping container or the like, the workpiece 12 can be a metal bracket, strap, frame, etc. located at the exterior of the container and can be constructed of sheet metal such as steel or aluminum; the body or walls of the container can be constructed of members such as workpiece 14 which is fabricated of plywood, fiberboard, or the like, or other materials which have a relatively soft core and are susceptible to crushing under high, local loads. In the embodiment shown in FIG. 2, the workpiece 14 is constructed of a fiberglass reinforced plywood having a plywood core and fiberglass reinforced plastic layers 16 and 18 with the layer 16 defining the interior of the container. In this regard the plastic layers 16 and 18 are impervious to water to permit a watertight construction. It should be understood that the preceding materials for a shipping container have been discussed by way of example only and that the present invention can be utilized in other applications and with other materials.

Looking now to FIGS. 1-3 and 7-9 the fastener 10 includes a pin 20, a sleeve 22 and a retaining clip 24. The sleeve 22 has an enlarged head 26 and a generally straight shank 28 which is adapted to fit in a clearance relationship in at least some of the aligned bores 30 and 32 through workpieces 12 and 14, respectively. The sleeve head 26 is generally inwardly dished or concave on its inner surface 34 to provide clearance with the corner of bore 32 through inner workpiece layer 16. At the same time the concave structure distributes the installation and final clamp loads radially outwardly to inhibit excessive localized deformation or crushing of the inside workpiece 14. The sleeve shank 28 has a generally uniform outside diameter and a through bore 36 of a generally uniform diameter (see FIG. 8). The outside surface, however, of sleeve shank 28 is provided with a pair of annular grooves 38 and 40. Groove 38 is relatively narrow in width and defines a locking portion to lock the sleeve 22 to the pin 20 in a manner to be seen. The groove 40 is substantially wider and provides a grip adjustment feature of the fastener 10.

The pin 20 has an enlarged head 42 and an elongated shank 44. Pin head 42 is of a generally flat, truss head construction with its outer diameter being substantially larger than the diameter of bores 30, 32. The large head 42 has a low profile to provide a generally smooth surface at the exterior of the sheet metal workpiece 12. The pin head 42 is generally inwardly dished or concave on its inner surface 43 to provide clearance with the corner of bore 30. The concave structure also distributes the installation and final clamp loads. The pin shank 44 is of a diameter smaller than workpiece bores 30, 32 and has a straight, smooth retaining shank portion defining a retaining groove 46 adjacent the head 42 and a larger diameter straight, smooth intermediate shank portion 48. The diameter of intermediate shank portion 48 is selected to provide a snug fit with the sleeve through bore 36. An annular lock groove 50 is formed within the outer surface of the intermediate shank portion 48 proximate to the retaining groove 46.

Following the intermediate shank portion 48 is a generally straight shank portion 52 of reduced diameter which is a part of a pull portion 54 which includes a plurality of annular pull grooves 56. A reduced diameter annular breakneck groove 58 is located between the intermediate shank portion 48 and the pull portion 54 and defines the weakest portion of the pin 20.

As noted it is desirable to be able to insert the pin 20 into the workpiece bores 30 and 32 from the outside of the container and to have the pin 20 held therein with a sufficient retention force such as to permit the assembly of the sleeve 22 thereon from the opposite side and the application of an installation tool without the pin 20 falling out or being pushed out. One problem in this regard is that the openings 30 and 32 are not necessarily formed to close dimensional tolerances. In the present invention, and under the noted circumstances, the pin 20 can be preassembled into and securely retained in the openings 30 and 32 by the resilient retaining clip 24 which is adapted to be located on the pin 20 within the retaining groove 46.

The retaining clip 24 is of a split ring construction and has a relaxed inside diameter which is of a preselected clearance with the retaining groove 46. The inside diameter of clip 24 is substantially less than the diameter of the intermediate shank portion 48 such that it will be axially and radially retained within the retaining groove 46. The clip 24 is sufficiently resilient such that it can be readily expanded radially to be located in the retaining groove 46.

The relaxed, outside diameter of the clip 24 is greater than the diameter of workpiece bore 30 in the metal workpiece 12. Now, with the retaining clip 24 assembled in the retaining groove 46, the pin 20 can be inserted into the workpiece openings 30 and 32; the retaining clip 24 will be moved into the outer opening 30 and will be radially compressed in size to fit the opening 30 and hence will be held therein with a preselected frictional or interference fit. In this manner the pin 20 will be axially held to the workpieces 12 and 14 with a sufficient retention force such that the sleeve 22 can be assembled onto the pin shank 44 from the inside of the container and the installation tool applied thereto without the pin 20 falling or being pushed out. In order to facilitate insertion of the retaining clip 24 into the workpiece opening 30 the opposite radially outer edges 62 are chamfered or beveled (see FIG. 9). Note in this regard that both edges are beveled so that the retaining clip 24 can be located with either edge facing the workpiece opening 30. The gap 60 between opposite ends of the retaining clip 24 is provided to be of a dimension such that with the clip 24 in its fully, radially compressed condition the gap 60 will not be closed; at the same time, the radially compressed inside diameter of the clip 24 will still provide clearance with the outer surface of the retaining groove 46 in pin 20. In this manner, the pin 20 and retaining clip 24 can be securely, axially held in workpiece openings 30 and 32 even where these openings vary in size over a relatively wide tolerance range.

The fastener 10 is set by the application of a relative axial force between the pin 20 and sleeve 22 via a pull tool 64 (partially shown) which can be of a type generally known in the art and hence the details thereof have been omitted.

To install the fastener 10, the operator first drills the workpiece bores 30 and 32 inwardly from the exterior workpiece 12. As previously noted, frequently the outer workpiece bore 30 will have already been formed. The operator now inserts the pin 20, with the retaining clip 24 attached, into the workpiece bores 30, 32. The latter assembly is moved into place with an interference fit, as noted, so that the pin 20 and clip 24 are axially held in place for the remainder of the installation steps. Now the operator moves to the inside of the container or opposite side of the workpieces 12, 14 and places the sleeve 22 over the protruding portion of the pin shank 54. Next the tool 64 is applied to the fastener 10 and actuated by the operator to set the fastener 10. In this regard the tool 64 has an anvil member 66 having an engaging surface 68 which is concave to generally conform to the convex outer surface of the sleeve head 26. A collet assembly 70 is slidably supported within the anvil member 66 and has a plurality of chuck jaws 72 adapted to grippingly engage the pull grooves 56 of pull portion 54. A reduced diameter bore 74 located in the anvil member 64 is only slightly larger than the outside diameter of the pull portion 54 whereby it pilots the pull portion 54 into the opening defined by the chuck jaws 72.

The interference assembly force between the clip 24 and the workpiece bore 30 is sufficient to accommodate the insertion of the pin 20 into the chuck jaws 72 without the pin 20 and clip 24 being axially pushed from the bores 30, 32; thus, as noted the fastener 10 can be installed by a single operator with a minimum of installation steps.

Upon actuation of the tool 64, the collet assembly 70 is moved axially rearwardly or away from the engaging surface 68 of anvil 66 whereby a relative axial force is applied between the pin 20 and sleeve 22. The axial force moves the sleeve shank 28 further onto the pin shank 44 with the end of the sleeve shank 28 moving the clip 24 into the cavity 43 under pin head 26. In this condition the sleeve lock groove 38 is located generally in radial alignment with the pin lock groove 50. As the relative axial force continues to increase, the sleeve shank 28 is subjected to an increasing column load until the sleeve material at the sleeve lock groove 38 buckles radially inwardly into the pin lock groove 50 (see FIG. 4).

As shown in FIGS. 1-5, the workpieces 12 and 14 define a minimum workpiece thickness to be fastened together by the fastener 10. In this situation, then, the enlarged sleeve head 26 will not be finally seated against the inner layer 16 until further movement relative to the pin 20. The latter movement is permitted by the grip adjusting groove 40 in sleeve shank 28. Thus after the lock has been formed between sleeve lock groove 38 and pin lock groove 50, the tool 64 will continue to apply an increasing relative axial force between the pin 20 and sleeve 22. The increased column load on the sleeve grip adjusting groove 40 will cause it to buckle radially outwardly. Because the core material of the workpiece 14 is relatively soft, it will be readily deformed by the buckled material of the sleeve grip adjusting groove 40. This will continue until the enlarged sleeve head 26 engages the inner workpiece layer 16.

At this point the sleeve head 24 has now engaged the inside layer 16 of workpiece 14 and axial movement of the sleeve 22 is arrested as the workpieces 12 and 14 are now clamped together. As the relative axial force increases, the pin shank 44 will be severed at the breakneck groove 58 and the installation is completed as shown in FIG. 5. The mechanical lock provided by the material of the sleeve lock groove 38 as deformed into the pin lock groove 50 retains the load clamping the workpieces 12 and 14 together.

The sleeve lock groove 38 and grip adjustment groove 40 are both located externally on the sleeve shank 28. With this construction the sleeve material will be urged radially inwardly as column buckling occurs. The material of the sleeve lock groove 38 being radially in line with pin lock groove 50 will buckle radially inwardly. However, the material of the grip adjustment groove 40 will be in line with the intermediate pin shank portion 48 which, at that location, is snugly received with the sleeve bore 36. Here the material of grip adjustment groove 40 will be urged radially outwardly since it will be inhibited from moving radially inwardly. In order to assist the later radial outward buckling, the leading end surface 41 of the groove 40 is provided to be of a relatively sharp contour extending radially generally in quadrature (or at a right angle) with the axis of sleeve 22 and having a minimal root radius R1; the trailing end surface 43 has a generally curved contour with a larger root radius R2. The larger radius R2 is provided to inhibit the initiation of buckling near the sleeve head 26 and hence the surface 43 could be inclined at an included angle substantially greater than 90°, i.e. around 120°. In one form of the invention, minimal root radius R1 was no greater than around 0.030" while trailing root radius was generally around 0.100".

Note that the sleeve lock groove 38 is deeper than the grip adjustment groove 40. This is to assure that the lock will be formed before deformation for grip adjustment. With regard to the latter, in one form of the invention the axial width of the grip adjustment groove 40 was at least between around 2 to 3 times the axial width of the sleeve lock groove 38.

As noted the grip adjustment groove 40 permits the fastener 10 to be used in fastening workpieces varying in total thickness over a significant range. FIG. 6 depicts the fastener in a condition for fastening workpieces having a maximum total thickness. Thus in the description of the assembly of FIG. 6, components similar to like components of FIGS. 1-5 have been given the same numerical designation with the addition of the letter postscript "a" and hence the description of such similarly number components will not be fully repeated.

Thus in FIG. 6 the total thickness of workpieces 12a and 14a is the maximum for fastener 10a (which is identical to fastener 10). In this condition the sleeve head 26a has been moved to its final engaged position against the inner layer 16a of workpiece 14a and the fastener 10a set without significant buckling of the sleeve grip adjustment groove 40a. Note that with either the minimum grip condition of FIGS. 1-5 or the maximum grip condition of FIG. 6, the remaining portion of the breakneck groove 58, 58a will not extend outwardly beyond the confines of the sleeve head 26, 26a. This is to assure a relatively smooth interior surface whereby snagging, etc. is inhibited.

The above construction is especially advantageous when the fastener 10, (10a) is constructed of relatively hard materials. In one form of the invention the pin 20, (20a) was constructed of AISI Type 305 Stainless Steel having a hardness of around 17-23 Rc, the sleeve (22, 22a) was of AISI Type 316 Stainless Steel having a hardness of around 70-80 Rb and the retaining clip 24, (24a) was of Monel Alloy R-405 having a hardness of around 80-90 Rb. In this regard, the retaining clip 24, (24a) is substantially non-deformable axially in response to the loads imposed thereon by the sleeve shank 28, (28a). This facilitates the accurate location of the sleeve lock groove 38, (38a) in radial alignment with the pin lock groove 50, (50a) as the buckling loads are applied to the sleeve shank 28, (28a) and reacted against the clip 24, (24a).

Thus the fastener 10 (10a) of the present invention can be installed single-handedly by one operator with a simplified installation procedure while providing the noted advantages including a mechanical lock between pin and sleeve, a high clamp up of the workpieces, and a wide grip range.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system for securing workpieces having aligned openings with at least one of the workpieces having a relatively soft core and another of the workpieces being of a relatively hard material with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having an annular sleeve lock groove in its outer surface and an annular grip adjustment groove in its outer surface axially spaced therefrom, said sleeve lock groove being located farther from said sleeve head than said grip adjustment groove, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove being located between said pull portion and said intermediate shank portion, a lock groove being located in said intermediate shank portion, a retaining clip being of a split construction and adapted to be located and axially captured within said pin retaining groove, said retaining clip being generally non-deformable axially, said retaining clip having a relaxed inside diameter greater than the diameter of said retaining groove of said pin, said retaining clip having a relaxed outside diameter greater than that one of the aligned openings of that one of the workpieces of hard material and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inserted over said pin shank and the tool is applied to said pull portion, said sleeve shank having its free end engageable with said retaining clip under said relative axial force to position said sleeve lock groove in radial alignment with said pin lock groove, said sleeve lock groove being radially deformed into said pin lock groove in response to said relative axial force attaining a first preselected magnitude to thereby lock said pin and said sleeve together, said grip adjustment groove being adapted to deform radially outwardly in response to said relative axial force being of a second preselected magnitude greater than said first preselected magnitude to permit axial movement of said sleeve head into engagement with the confronting one of the workpieces, said grip adjustment groove being located within the confines of the relatively soft core whereby radial outward deformation thereof is not inhibited, said pin severing at said breakneck groove when said relative axial force attains a third preselected magnitude greater than said first and said second preselected magnitudes after said enlarged sleeve head has engaged the opposite one of the workpieces.

2. The fastening system of claim 1 with said grip adjustment groove having an axial width at least between around 2 to 3 times the axial width of said sleeve lock groove.

3. In a fastening system for securing workpieces having aligned openings with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having a sleeve lock groove and a grip adjustment groove axially spaced therefrom, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove being located between said pull portion and said intermediate shank portion, a lock groove being located in said intermediate shank portion, a retaining clip being of a split construction and adapted to be located and axially captured within said pin retaining groove, said retaining clip having a relaxed inside diameter greater than the diameter of said retaining groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inserted over said pin shank and the tool is applied to said pull portion, said sleeve shank having its free end engageable with said retaining clip to position said sleeve lock groove in radial alignment with said pin lock groove, said sleeve lock groove being radially deformed into said pin lock groove in response to said relative axial force attaining a first preselected magnitude to thereby lock said pin and said sleeve together, said grip adjustment groove being adapted to deform radially outwardly in response to said relative axial force being of a second preselected magnitude greater than said first preselected magnitude to permit axial movement of said sleeve head into engagement with the confronting one of the workpieces, said pin serving at said breakneck groove when said relative axial force attains a third preselected magnitude greater than said first and said second preselected magnitudes after said enlarged sleeve head has engaged the opposite one of the workpieces.

4. The fastening system of claim 3 with said grip adjustment groove having an axial width at least between around 2 to 3 times the axial width of said sleeve lock groove.

5. In a fastening system for securing workpieces having aligned openings with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having a sleeve lock groove, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove located between said pull portion and said intermediate shank portion, a lock groove located in said intermediate shank portion, a retaining clip being of a split construction and adapted to be located and axially captured within said pin retaining groove, said retaining clip having a relaxed inside diameter greater than the diameter of said retaining groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inserted over said pin shank and the tool is applied to said pull portion, said sleeve shank having its free end engageable with said retaining clip to position said sleeve lock groove in radial alignment with said pin lock groove, said sleeve lock groove being radially deformed into said pin lock groove in response to said relative axial force attaining a first preselected magnitude to thereby lock said pin and said sleeve together, said pin severing at said breakneck groove when said relative axial force attains a second preselected magnitude greater than said first preselected magnitude after said enlarged sleeve head has engaged the opposite one of the workpieces.

6. The fastening system of claim 5 with said sleeve lock groove being annularly formed in the outer surface of said sleeve shank.

7. In a fastening system for securing workpieces having aligned openings with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having a grip adjustment groove, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove located between said pull portion and said intermediate shank portion, a lock groove located in said intermediate shank portion, a retaining clip being of a split construction and adapted to be located and axially captured within said pin retaining groove, said retaining clip having a relaxed inside diameter greater than the diameter of said retaining groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inserted over said pin shank and the tool is applied to said pull portion, lock means on said sleeve and said pin for locking said pin and said sleeve together in response to said relative axial force attaining a first preselected magnitude to thereby lock said pin and said sleeve together, said grip adjustment groove being adapted to deform radially outwardly in response to said relative axial force being of a second preselected magnitude greater than said first preselected magnitude to permit axial movement of said sleeve head into engagement with the confronting one of the workpieces, said pin severing at said breakneck groove when said relative axial force attains a third preselected magnitude greater than said first and said second preselected magnitudes after said enlarged sleeve head has engaged the opposite one of the workpieces.

8. The fastening system of claim 7 with said grip adjustment groove being annularly formed in said sleeve shank and adapted to be located in radial alignment with said intermediate pin shank portion, said intermediate pin shank portion being a snug fit with said sleeve through bore in the location of said grip adjustment groove whereby the material of said grip adjustment groove will be urged to be deformed radially outwardly.

9. In a fastening system for securing workpieces having aligned openings with at least one of the workpieces having a relatively soft core and another of the workpieces being of a relatively hard material with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having an annular sleeve lock groove and an annular grip adjustment groove formed in the outside surface of said sleeve shank, said sleeve lock groove being located axially farther from said sleeve head than said grip adjustment groove, said grip adjustment groove having an axial width at least between around 2 to 3 times the axial width of said sleeve lock groove, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove located between said pull portion and said intermediate shank portion, a lock groove being located in said intermediate shank portion, a retaining clip being of a split construction and adapted to be located and axially captured within said pin retaining groove, said retaining clip having a relaxed inside diameter greater than the diameter of said retaining groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inserted over said pin shank and the tool is applied to said pull portion, said sleeve shank having its free end engageable with said retaining clip under said relative axial force to position said sleeve lock groove in radial alignment with said pin lock groove, said sleeve lock groove being radially deformed into said pin lock groove in response to said relative axial force attaining a first preselected magnitude to thereby lock said pin and said sleeve together, said grip adjustment groove being adapted to deform radially outwardly in response to said relative axial force being of a second preselected magnitude greater than said first preselected magnitude to permit axial movement of said sleeve head into engagement with the confronting one of the workpieces, said grip adjustment groove being located in radial alignment with said intermediate pin shank portion, said pin shank portion being a snug fit with said sleeve through bore in the location of said grip adjustment groove whereby the material of said grip adjustment groove will be urged to be deformed radially outwardly, said grip adjustment groove being located within the confines of the relatively soft core material whereby radial outward deformation thereof is not inhibited, said pin severing at said breakneck groove when said relative axial force attains a third preselected magnitude greater than said second preselected magnitude after said enlarged sleeve head has engaged the opposite one of the workpieces.

10. The fastening system of claim 9 with said retaining clip being substantially axially non-deformable in response to the reaction of said relative axial force applied thereto by the engaging end of said sleeve shank.

11. In a fastening system for securing workpieces having aligned openings with at least one of the workpieces having a relatively soft core and another of the workpieces being of a relatively hard material with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having an annular sleeve lock groove in its outer surface and an annular grip adjustment groove in its outer surface axially spaced therefrom, said sleeve lock groove being located farther from said sleeve head than said grip adjustment groove, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove being located between said pull portion and said intermediate shank portion, a lock groove being located in said intermediate shank portion, a retaining clip being of a split construction and adapted to be located and axially captured within said pin retaining groove, said retaining clip being generally non-deformable axially, said retaining clip having a relaxed inside diameter greater than the diameter of said retaining groove of said pin, said retaining clip having a relaxed outside diameter greater than that one of the aligned openings of that one of the workpieces of hard material and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inerted over said pin shank and the tool is applied to said pull portion, said sleeve shank having its free end engageable with said retaining clip under said relative axial force to position said sleeve lock groove in radial alignment with said pin lock groove, sid sleeve lock groove being radially deformed into said pin lock groove in response to said relative axial force attaining a first preselected magnitude to thereby lock said pin and said sleeve together, said grip adjustment groove being adapted to deform radially outwardly in response to said relative axial force being of a second preselected magnitude greater than said first preselected magnitude to permit axial movement of said sleeve head into engagement with the confronting one of the workpieces, said grip adjustment groove being located within the confines of the relatively soft core whereby radial outward deformation thereof is not inhibited, said adjustment groove having a leading end surface and a trailing end surface at opposite axial ends, said leading end surface being farther from said sleeve head than said trailing end surface and being defined by a surface extending radially generally in quadrature with the axis of said sleeve, said pin severing at said breakneck groove when said relative axial force attains a third preselected magnitude greater than said first and said second preselected magnitudes after said enlarged sleeve head has engaged the opposite one of the workpieces.

12. The fastening system of claim 11 with said trailing end surface extending generally at an angle substantially greater than 90°.

13. In a fastening system for securing workpieces having aligned openings with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having a grip adjustment groove, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove located between said pull portion and said intermediate shank portion, a lock groove located in said intermediate shank portion, a retaining clip being of a split construction and adapted to be located and axially captured within said pin retaining groove, said retaining clip having a relaxed inside diameter greater than the diameter of said retaining groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inserted over said pin shank and the tool is applied to said pull portion, lock means on said sleeve and said pin for locking said pin and said sleeve together in response to said relative axial force attaining a first preselected magnitude to thereby lock said pin and said sleeve together, said grip adjustment groove being adapted to deform radially outwardly in response to said relative axial force being of a second preselected magnitude greater than said first preselected magnitude to permit axial movement of said sleeve head into engagement with the confronting one of the workpieces, said adjustment groove having a leading end surface and a trailing end surface at opposite axial ends, said leading end surfce being farther from said sleeve head than said trailing end surface and being defined by a surface extending radially generally in quadrature with the axis of said sleeve, said pin severing at said breakneck groove when said relative axial force attains a third preselected magnitude greater than said first and said second preselected magnitudes after said enlarged sleeve head has engaged the opposite one of the workpieces.

14. The fastening system of claim 13 with said trailing end surface extending generally at an angle substantially greater than 90°.

15. In a fastening system for securing workpieces having aligned openings with at least one of the workpieces having a relatively soft core and another of the workpiece being of a relatively hard material with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said sleeve shank having an annular sleeve lock groove and an annular grip adjustment groove formed in the outside surface of said sleeve shank, said sleeve lock groove being located axially farther from said sleeve head than said grip adjustment groove, said grip adjustment groove having an axial width at least between around 2 to 3 times the axial width of said sleeve lock groove, said pin having an enlarged pin head and a pin shank, said pin shank comprising a generally uniform intermediate shank portion, a reduced diameter retaining groove adjacent said pin head, a pull portion located on the end of said pin shank opposite said pin head and adapted to be gripped by a tool for applying a relative axial force between said pin and said sleeve to set the fastener, and a breakneck groove located between said pull portion and said intermediate shank portion, a lock groove being located in said intermediate shank portion, a retaining clip being of a split construction and adapted to be located and axially captured within said pin retaining groove, said retaining clip having a relaxed inside diameter greater than the diameter of said retaining groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a preinstalled condition, said frictional connection being sufficient to hold said pin and said clip to said workpieces as said sleeve is inserted over said pin shank and the tool is applied to said pull portion, said sleeve shank having its free end engageable with said retaining clip under said relative axial force to position said sleeve lock groove in radial alignment with said pin lock groove, said sleeve lock groove being radially deformed into said pin lock groove in response to said relative axial force attaining a first preselected magnitude to thereby lock said pin and said sleeve together, said grip adjustment groove being adapted to deform radially outwardly in response to said relative axial force being of a second preselected magnitude greater than said first preselected magnitude to permit axial movement of said sleeve head into engagement with the confronting one of the workpieces, said grip adjustment groove being located in radial alignment with said intermediate pin shank portion, said pin shank portion being a snug fit with said sleeve through bore in the location of said grip adjustment groove whereby the material of said grip adjustment groove will be urged to be deformed radially outwardly, said grip adjustment groove being located within the confines of the relatively soft core material whereby radial outward deformation thereof is not inhibited, said adjustment groove having a leading end surface and a trailing end surface at opposite axial ends, said leading end surface being farther from said sleeve head than said trailing end surface and being defined by a surface extending radially generally in quadrature with the axis of said sleeve, said pin severing at said breakneck groove when said relative axial force attains a third preselected magnitude greater than said second preselected magnitude after said enlarged sleeve head has engaged the opposite one of the workpieces.

16. The fastening system of claim 15 with said trailing end surface extending generally at an angle substantially greater than 90°.

* * * * *